(12) United States Patent
Ryken et al.

(10) Patent No.: US 11,358,657 B2
(45) Date of Patent: Jun. 14, 2022

(54) WORK VEHICLE TRANSMISSION PROGNOSTICS SYSTEM AND METHOD

(71) Applicant: Deere & Company, Moline, IL (US)

(72) Inventors: Michael J. Ryken, Cedar Falls, IA (US); Roger W. Burjes, Cedar Falls, IA (US); Rainer Gugel, Plankstadt (DE); Adam J. Faucher, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 281 days.

(21) Appl. No.: 16/669,112

(22) Filed: Oct. 30, 2019

(65) Prior Publication Data
US 2021/0129926 A1 May 6, 2021

(51) Int. Cl.
| | |
|---|---|
| *B62D 49/06* | (2006.01) |
| *G07C 5/04* | (2006.01) |
| *E02F 9/26* | (2006.01) |
| *E02F 9/20* | (2006.01) |
| *F16H 3/72* | (2006.01) |

(52) U.S. Cl.
CPC ............... *B62D 49/06* (2013.01); *G07C 5/04* (2013.01); *E02F 9/26* (2013.01)

(58) Field of Classification Search
USPC ....................................................... 701/33.4
See application file for complete search history.

(56) References Cited

U.S. PATENT DOCUMENTS

| | | | | |
|---|---|---|---|---|
| 6,045,481 A | * | 4/2000 | Kumagai | .............. F16H 61/664 |
| | | | | 476/41 |
| 8,706,371 B1 | * | 4/2014 | Patel | ...................... F16D 48/06 |
| | | | | 701/68 |

(Continued)

FOREIGN PATENT DOCUMENTS

| | | |
|---|---|---|
| DE | 102018212712 A1 | 1/2019 |
| DE | 102017217404 A1 | 4/2019 |

OTHER PUBLICATIONS

Deere & Company, pending Utility U.S. Appl. No. 16/159,369, filed Oct. 12, 2018, all pages.

(Continued)

*Primary Examiner* — Tyler D Paige
(74) *Attorney, Agent, or Firm* — Klintworth & Rozenblat IP LLP (57) ABSTRACT

A work vehicle includes an engine; at least one continuously variable power source (CVP) configured to operate according to a commanded torque; an output shaft; a transmission positioned operatively between the output shaft and the engine and the CVP such that the output shaft selectively receives power from one or both of the engine and the at least one CVP; and a prognostics system configured to monitor a respective component associated with at least one of the output shaft or the transmission. The prognostics system includes a prognostics controller having a processor and memory architecture, configured to: receive input data, including the commanded torque; generate a usage value for the respective component for a time period as a function of the commanded torque; aggregate the usage value with previous usage values to generate a prognostics value over a life of the respective component; and store the prognostics value.

20 Claims, 3 Drawing Sheets

(56) References Cited

U.S. PATENT DOCUMENTS

| | | | |
|---|---|---|---|
| 9,558,600 B2 | 1/2017 | Rice et al. | |
| 10,119,598 B2 | 11/2018 | Rekow et al. | |
| 10,267,691 B2 | 4/2019 | Leonard et al. | |
| 2013/0253787 A1* | 9/2013 | Hou | F16H 61/0021 701/58 |
| 2015/0239343 A1* | 8/2015 | Janasek | B60K 6/36 74/661 |
| 2015/0292608 A1* | 10/2015 | McKinzie | B60K 6/547 74/661 |
| 2020/0132179 A1* | 4/2020 | Minami | B60K 17/10 |

OTHER PUBLICATIONS

German Search Report issued in application No. DE102020211888.4, dated Jun. 16, 2021, 12 pages.

* cited by examiner

WORK VEHICLE TRANSMISSION PROGNOSTICS SYSTEM AND METHOD

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicle powertrains, including prognostics systems associated with multi-mode powertrains for the operation of work vehicles for agricultural, forestry, construction, and other applications.

BACKGROUND OF THE DISCLOSURE

It may be useful, in a variety of settings, to utilize both a traditional engine (e.g., an internal combustion engine) and at least one continuously variable power source (CVP) (e.g., an electric motor/generator or hydraulic motor/pump, and so on) with one or more continuously variable machines (CVMs) to provide useful power to an output member. For example, a portion of engine power may be diverted to drive a first CVM, which may in turn drive a second CVM. Power from the engine and/or the second CVP may be delivered to the output member (e.g., a vehicle axle or other output shaft). The engine, the CVMs, and the output member may be operatively connected via an infinitely or continuously variable transmission (CVT).

SUMMARY OF THE DISCLOSURE

In one example, a work vehicle includes an engine; at least one continuously variable power source (CVP) configured to operate according to a commanded torque; an output shaft; a transmission positioned operatively between the output shaft and the engine and the at least one CVP such that the output shaft selectively receives power from one or both of the engine and the at least one CVP to drive the output shaft; and a prognostics system configured to monitor a respective component associated with at least one of the output shaft or the transmission. The prognostics system includes a prognostics controller having a processor and memory architecture, configured to: receive input data, including the commanded torque for the at least one CVP; generate a usage value for the respective component for a time period as a function of the commanded torque; aggregate the usage value with previous usage values to generate a prognostics value over a life of the respective component; and store the prognostics value.

In another example, a prognostics system is provided for work vehicle with a powertrain having a transmission with a clutch arrangement to selectively transform input torque from an engine and a continuously variable power source (CVP) into output torque to drive an output shaft. The prognostics system includes a prognostics controller configured to monitor a respective component associated with at least one of the output shaft or the transmission. The prognostics controller includes a processor and memory storing one or more computer programs executable by the processor to: receive input data, including the commanded torque for the at least one CVP; generate a usage value for the respective component for a time period as a function of the commanded torque; aggregate the usage value with previous usage values to generate a prognostics value over a life of the respective component; and store the prognostics value.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed work vehicle transmission prognostics system and method, as shown in the accompanying figures of the drawings described briefly above. Various modifications to the example embodiments may be contemplated by one of skill in the art.

For convenience of notation, "component" may be used herein, particularly in the context of a planetary gear set, to indicate an element for transmission of power, such as a sun gear, a ring gear, or a planet gear carrier. Further, references to a "continuously" variable transmission, powertrain, or power source will be understood to also encompass, in various embodiments, configurations including an "infinitely" variable transmission, powertrain, or power source.

In the discussion below, various example configurations of shafts, gears, and other power transmission elements are described. It will be understood that various alternative configurations may be possible, within the spirit of this disclosure. For example, various configurations may utilize multiple shafts in place of a single shaft (or a single shaft in place of multiple shafts), may interpose one or more idler gears between various shafts or gears for the transmission of rotational power, and so on.

The continuously variable transmission (CVT) of the present disclosure may provide a plurality of different modes. For example, a "split-path" power transmission mode may be provided, in which power from both the engine and a CVP is combined for delivery of useful power to the output member. This is called "split-path" power transmission because it is split between a direct mechanical path from the engine and an infinitely/continuously variable path through one or more CVPs. In additional embodiments, useful power may be provided by a CVP but not by the engine (except to the extent the engine drives the CVP). This may be referred to as "CVP-only" power transmission or series mode. Finally, in some embodiments, useful power may be provided by the engine (e.g., via various mechanical transmission elements, such as shafts and gears), but not by a CVP. This may be referred to as "mechanical-path" power delivery.

In certain embodiments, an engine may provide power via various mechanical (or other) power transmission elements (e.g., various shafts and gears, and so on) to both a first input component of a variator (e.g., a planet carrier of a summing planetary gear set) and an input interface (e.g., a splined connection for a rotating shaft) of a first CVP. The first CVP (e.g., an electrical or hydraulic machine) may convert the power to a different form (e.g., electrical or hydraulic power) for transmission to a second CVP (e.g., another electrical or hydraulic machine), in order to allow the second CVP to provide rotational power to a second input of the variator (e.g., a sun gear of the summing planetary gear set).

As such, the transmission of the present disclosure is a CVT that may be configured to operate over a plurality of modes that provide different output speed ranges. The transmission includes a number of rotating components, such as shafts, clutches, bearings, and/or other components to implement such operation. The components are subject to wear during operation that varies from component to component and with respect to the nature of the usage.

Accordingly, the present disclosure provides a prognostics system that monitors and/or evaluates the components of the powertrain, particularly the transmission. In one example, the prognostics system generates usage values for a component of interest based on the torque applied to the respective component. The torque applied to the respective component may be derived from the commanded torque of the CVP, which is generally generated by a vehicle controller during operation of the powertrain. In particular, the prognostics system may use a torque gear ratio constant of the designated mode to derive the torque applied to the component from the commanded torque of the CVP. The usage values may further be a function of the number of component cycles to which the respective component is subject to the torque, as well as a component exponent that generally represents the impact of the torque on the respective component.

As such, the usage value represents the usage (or wear) on a particular component over a time period. The usage values may be aggregated over the life of the subject component to result in a prognostics value that represents the lifetime wear of the component. The prognostics value is updated as operation continues to provide a running indication of the lifetime wear of the component. As a result, the prognostics values may be used to evaluate components, including with respect to maintenance and replacement decisions.

As will become apparent from the discussion herein, the disclosed prognostics system may be used advantageously in a variety of systems and with a variety of machinery. For example, referring now to FIG. 1, a work vehicle 10 is depicted as a tractor that may at least partially implement a prognostics system 12 associated with a powertrain 14 (shown schematically). It will be understood, however, that other configurations of the vehicle 10 may be possible, including configurations with the vehicle 10 as a different kind of tractor, a harvester, a log skidder, a grader, or one of various other work vehicle types. It will further be understood that the disclosed powertrains 14 may also be used in non-work vehicles and non-vehicle applications (e.g., fixed-location power installations). The prognostics system 12 is described in greater detail below after a brief description of the vehicle 10 and powertrain 14.

Figure 1:
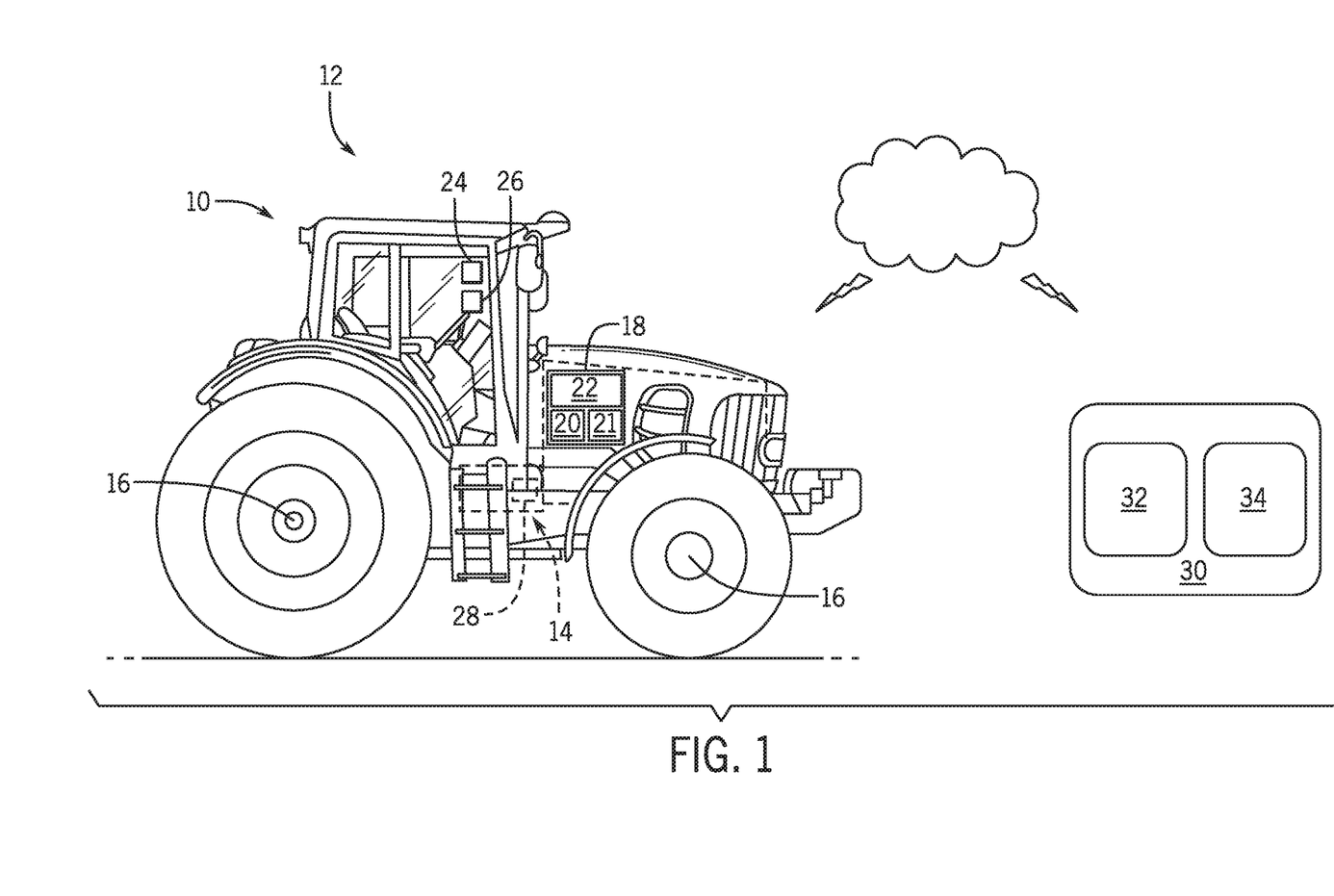
FIG. 1 is a side view of a work vehicle configured to implement a prognostics system according to an example embodiment of the present disclosure.

Generally, the powertrain 14 may be configured to generate power and to transmit the power from one or more power sources (e.g., engines, motors, and/or other power sources, as discussed below) to an output member (e.g., an output shaft). In some embodiments, the powertrain 14 may transmit the power to rear and/or front axles 16 of the work vehicle 10. The powertrain 14 may further be configured to deliver power to a power take-off shaft for powering an implement that is supported on the vehicle 10 or that is supported on a separate vehicle. It will be appreciated that the powertrain 14 may be configured for delivering power to other power sinks without departing from the scope of the present disclosure.

In one example, the work vehicle 10 includes a vehicle controller 18 (or multiple controllers) to control one or more aspects of the operation of the work vehicle 10, and in some embodiments, facilitate implementation of the prognostics system 12. For example, the vehicle controller 18 may include and/or be associated with a prognostics controller 22 for implementing the functions of the prognostics system 12. In one example, the vehicle controller 18 (and prognostics controller 22) may be implemented with processing architecture such as a processor 20 and memory 21. For example, the processor 20 may implement the functions described herein based on programs, instructions, and data stored in memory 21.

As such, the controllers 18, 22 may be configured as one or more computing devices with associated processor devices and memory architectures, as a hard-wired computing circuit (or circuits), as a programmable circuit, as a hydraulic, electrical or electro-hydraulic controller, or otherwise. The controllers 18, 22 may be configured to execute various computational and control functionality with respect to the work vehicle 10 (or other machinery). In some embodiments, the controllers 18, 22 may be configured to receive input signals in various formats (e.g., as hydraulic signals, voltage signals, current signals, and so on), and to output command signals in various formats (e.g., as hydraulic signals, voltage signals, current signals, mechanical movements, and so on).

The controllers 18, 22 may be in electronic, hydraulic, mechanical, or other communication with various other systems or devices of the work vehicle 10 (or other machinery). For example, the controllers 18, 22 may be in electronic or hydraulic communication with various actuators, sensors, and other devices within (or outside of) the work vehicle 10, including various devices described below. The controllers 18, 22 may communicate with other systems or devices (including other controllers) in various known ways, including via a CAN bus (not shown) of the work vehicle 10, via wireless or hydraulic communication mechanisms, or otherwise.

In some embodiments, the controllers 18, 22 may be configured to receive input commands from, and to interface with, an operator via a human-vehicle operator interface 24 that enables interaction and communication between the operator, the vehicle 10, the prognostics system 12, and a maintenance or monitoring center 30 (discussed below). The operator interface 24 may be disposed inside a cab of the work vehicle 10 for easy access by the vehicle operator. The operator interface 24 may be configured in a variety of ways. In some embodiments, the operator interface 24 may include an input device with one or more joysticks, various switches or levers, one or more buttons, a touchscreen interface that may be overlaid on a display, a keyboard, a speaker, a microphone associated with a speech recognition system, or various other human-machine interface devices. The operator interface 24 also includes the display device, which can be implemented as a flat panel display device or other display type that is integrated with an instrument panel or console of the work vehicle 10.

As one example, the operator interface 24 generally includes a number of devices for operating the vehicle 10, such as speed and mode selection devices for the powertrain 14. In further examples, the display device of the operator interface 24 may function to render vehicle prognostics and/or usage information generated by the prognostics system 12 for display to the vehicle operator.

The work vehicle 10 further includes a vehicle communication component 26 enables communication between the operator, the controllers 18, 22, and the monitoring center 30. The vehicle communication component 26 includes any suitable system for receiving and transmitting data, directly or through a network. For example, the communication component 26 may include a radio or suitable transceiver configured to receive and send data transmitted by modulating a radio frequency (RF) signal via a cellular telephone network according to the long-term evolution (LTE) standard, although other techniques may be used. The communication component 26 may achieve bi-directional communications over Bluetooth® or by utilizing a Wi-Fi standard, i.e., one or more of the 802.11 standards as defined by the Institute of Electrical and Electronics Engineers ("IEEE"), as is well known to those skilled in the art. Generally, the communication component 26 may include a Bluetooth® transceiver, a radio transceiver, a cellular transceiver, an LTE transceiver and/or a Wi-Fi transceiver.

The work vehicle 10 further includes various sensors 28 that function to collect information about the work vehicle 10. Such information may be provided to the controllers 18, 22 and/or the communication component 26 for potential transmission and/or use by the prognostics system 12. As examples, the sensors 28 may include operational sensors associated with the vehicle systems and components discussed above, including engine and transmission sensors, fuel sensors, and battery sensors. In one example, the sensors 28 may include one or more speed and/or torque sensors associated with the transmission of the powertrain 14, particularly one or more speed and/or torque sensors associated with an input shaft, one or more transmission shafts, and/or one or more output shafts. In some examples, the sensors 28 may be omitted.

As introduced above, the vehicle 10 is configured, based on commands from the vehicle controller 18, to perform various work tasks. For example, the vehicle controller 18 generates commands for the powertrain 14 (e.g., engine, motors, transmission) based on operating conditions and inputs via the operator interface 24. As described in greater detail below, the prognostics system 12 may collect information associated with the powertrain 14, particularly the transmission and motors, and generate usage and prognostics information associated with various components of the powertrain 14 that represent the health and/or, inversely, the remaining life of the powertrain components. The usage and prognostics information, such as in the form of usage or prognostics values, may be provided to the operator (e.g., displayed on a display device of the operator interface 24) and/or transferred to a monitoring center 30.

The prognostics system 12 may operate with respect to an individual vehicle 10, and in other examples, the prognostics system 12 may operate with respect to a group or fleet of vehicles. As noted above, the vehicle 10 may send usage and/or prognostics values to a central monitoring center 30 for storage, further analysis, and/or further evaluation. As such, the central monitoring center 30 may include a center communication component 32 for receiving the prognostics information and a center controller 34 for storing the prognostics information for further processing. In some examples, center controller 34 may operate in a manner similar or identical to the prognostics controller 22 described with respect to the vehicle 10. For example, the center controller 34 may receive raw and/or partially processed vehicle information to generate the resulting usage and/or prognostics values described below. In effect, the central monitoring center 30 may operate as an offboard maintenance and/or health monitor for the work vehicle 10. In other words, one or more aspects of the prognostics controller 22 discussed herein may be distributed across the center controller 34. Moreover, the central monitoring center 30 may receive such information from a number of vehicles to monitor the maintenance and/or health for a fleet or group of the work vehicle. Additionally, the monitoring center 30 may aggregate such data across vehicles to enable comparisons, system-wide evaluations, and trend identification. Such arrangement may enable better planning for maintenance operations, as well as evaluation of vehicle utilization and productivity Additional details regarding the prognostics system 12 will be provided after a more detailed description of the powertrain 14 in which the prognostics system 12 may be implemented.

Figure 2:
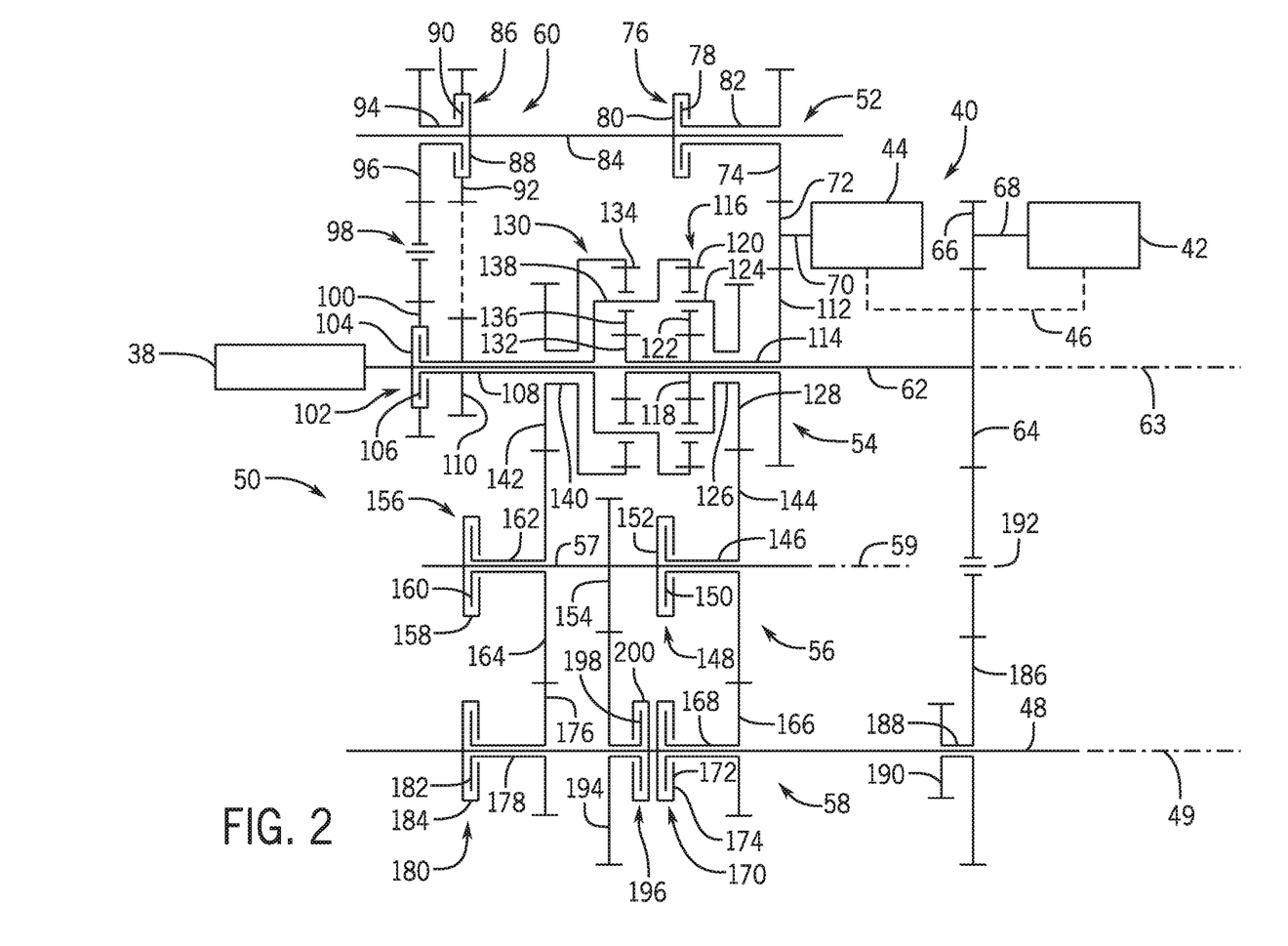
FIG. 2 is a schematic view of a multi-mode continuously variable transmission (CVT) of the work vehicle of FIG. 1 according to an example embodiment of the present disclosure.

Referring now to FIG. 2, an example configuration of the powertrain 14 is depicted schematically. The powertrain 14 may include an engine 38, which may be an internal combustion engine of various known configurations. The powertrain 14 may also include a continuously variable power source (CVP) 40. The CVP 40 may include at least one continuously variable machine (CVM), such as an electrical machine or a hydraulic machine. In the embodiment shown, the CVP 40 includes a first CVM 42 and a second CVM 44. As shown in FIG. 2, the first CVM 42 may be operably connected to the second CVM 44 via a conduit 46, such as one or more electrical wires.

The powertrain 14 may also include an output shaft 48 or other output member defining an output axis 49. The output shaft 48 may comprise or may be directly connected to one or more power sinks (e.g., one or both axles 16, power take-off ("PTO") shafts, and so on) of the vehicle 10. In certain embodiments, a torque converter or other device may be included between the engine 38 and the output shaft 48 (or another shaft (not shown)), although such a device is not necessary for the operation of the powertrain 14, as contemplated by this disclosure. Further, in certain embodiments, multiple shafts (not shown), including various shafts interconnected by various gears or other power transmission components, or equivalent power transmission components (e.g., chains, belts, and so on) may be included.

As noted above, the powertrain 14 may further include a transmission 50 for transferring power between the engine 38, the CVP 40, and the output shaft 48. The transmission 50 may include a plurality of components, such as shafts, gears, gearsets, clutches, brakes, and/or other components that interconnect the engine 38, the CVP 40, and the output shaft 48 as will be discussed in detail below. The transmission 50 may be considered a continuously variable or infinitely variable transmission. Also, the transmission 50 may be configured to provide selection between one of the plurality of transmission modes to vary the speeds and power flow paths.

Accordingly, the engine 38 may provide rotational power to the output shaft 48 via the transmission 50. The engine 38 may also provide rotational power to the first CVM 42 via the transmission 50. Continuing, the first CVM 42 may convert the received power to an alternate form (e.g., electrical or hydraulic power) for transmission over the conduit 46. This converted and transmitted power may be received by the second CVM 44 and then re-converted by the second CVM 44 to provide a rotational power output. Various known control devices (not shown) may be provided to regulate such conversion, transmission, re-conversion and so on.

In some embodiments, the first CVM 42 and the second CVM 44 are both electrical machines. Also, in some embodiments, the first and/or second CVMs 42, 44 may be configured to operate as a motor (to output mechanical power from electrical input power) and as a generator (to output electrical power from mechanical input power).

Generally, in some embodiments, the transmission 50 may include an input assembly 52 with an input shaft 62 to which the engine 38 is mounted and that defines an input or engine axis 63. In this example, the input assembly 52 may further include a further transmission shaft 84, spaced apart from the input shaft 62 and selectively coupled to the input shaft 62, as discussed in greater detail below. The input assembly 52 may include at least one component (an input transmission component) that is supported for rotation to facilitate transmission of power, as discussed below. As will be also discussed below, the engine 38 and the CVP 40 may be operatively connected to the input assembly 52.

The transmission 50 may also include a variator 54 at least partially mounted about the input shaft 62 such that, in this example, a central variator axis is coincident with the input axis 63. The variator 54 includes at least one component (a variator component) to facilitate transmission of power from the input assembly 52.

Thus, the variator 54 is operably connected to the engine 38 and the CVP 40. Generally, the variator 54 may include a variety of devices capable of summing the mechanical inputs from the engine 38 and the CVP 40 for a combined mechanical output to the output shaft 48 for split-path power transmission. In certain embodiments, as depicted in FIG. 2, the variator 54 may be configured as summing planetary gearsets (e.g., a double planetary gearset). It will be understood, however, that other configurations may be possible.

The transmission 50 may further include countershaft assembly 56 with a countershaft 57 defining a countershaft axis 59 and including at least one component (a countershaft component) that is supported for rotation to transfer power from the variator 54. Furthermore, the transmission 50 may include an output assembly 58 with the output shaft 48 and including at least one component (an output component) to transfer power from the countershaft assembly 56 to the output axis 49.

Accordingly, in some embodiments, the variator 54 may be disposed between, and operatively connected to, the input assembly 52 and the countershaft assembly 56. Also, the countershaft assembly 56 may be disposed between, and operatively connected to, the variator 54 and the output assembly 58. As such, the transmission 50 may be configured to enable power flow through the transmission 50 along a path from the input assembly 52, through the variator 54 and the countershaft assembly 56, and to the output assembly 58.

Generally, the transmission 50 may be configured as a multi-mode transmission and may provide selective shifting between the different modes. For example, the transmission 50 may provide one or more split-path power transmission modes. In each of these modes, power from the engine 38 and the CVP 40 may be combined or summed (e.g., by the variator 54), and the resulting combined/summed power may be delivered to the output shaft 48. In one split-path mode, the output shaft 48 may be rotated within a first speed range, and in another split-path mode, the output shaft 48 may be rotated within a second speed range. The second speed range may be higher than the first speed range in some embodiments. There may be additional split-path modes providing other speed ranges for the output shaft 48 as well.

Additionally, the transmission 50 may provide one or more CVP-only modes. For example, in some embodiments, the transmission 50 may, in a sense, disconnect the engine 38 from the output shaft 48 and instead deliver CVP power from the CVP 40 to the output shaft 48. In some embodiments, the speed range for the output shaft 48 during a CVP-only mode may be relatively low. For example, the transmission 50 may provide a CVP-only mode at which torque is maintained at the output shaft 48 while the output shaft 48 remains stationary (i.e., angular velocity of zero). This may be referred to as "powered zero". The output shaft 48 may be driven at relatively low speeds (i.e., "creeper speeds") as well in this CVP-only mode.

The transmission 50 may further include a control set 60 with a plurality of selective transmission components for selecting between the different transmission modes. The selective transmission components of the control set 60 may include wet clutches, dry clutches, dog collar clutches, brakes, or other similar components that may selectively move between an engaged position and a disengaged position. More specifically, a representative selective transmission component may include a first member and a second member that may engage each other (i.e., fixedly attach together for rotation as a unit) and, alternatively, disengage from each other (i.e., detach to allow relative rotation between the two). Although not shown, the control set 60 may be connected to a known control system for controlling actuation of the individual transmission components. Accordingly, as will be discussed further, the transmission 50 may provide effective power transmission across a number of modes such that the powertrain 14 is highly efficient.

Accordingly, the components of the transmission 50 will now be discussed in detail according to an example embodiment. As shown, the engine 38 may be coupled to drive the input (or engine) shaft 62 that is supported for rotation about the input axis 63. A first gear 64 may be fixed for rotation on the input shaft 62 at an end opposite the engine 38. The first gear 64 may be enmeshed with a second gear 66. The second gear 66 may be fixed for rotation on a first CVM shaft 68 connected to the first CVM 42 for delivering mechanical power to the first CVM 42.

The second CVM 44 may be coupled to a second CVM shaft 70. The second CVM shaft 70 may be considered the output shaft of the second CVM 44 and may be driven in rotation about an axis that is spaced apart from and parallel to the input shaft 62, in this embodiment. A third gear 72 may be fixed for rotation on the second CVM shaft 70. The third gear 72 may be enmeshed with a fourth gear 74.

The transmission 50 may further include a first clutch 76 of the control set 60. The first clutch 76 may be referred to as a "creeper clutch" in some embodiments. The first clutch 76 may include at least one first member 78 and at least one second member 80 (e.g., first and second clutch plates). The first member 78 may be fixed for rotation with a first hollow shaft 82, which in turn supports the fourth gear 74. The second member 80 is fixed for rotation on the transmission shaft 84. The first hollow shaft 82, on which the first member 78 of the first clutch 76 is mounted, may surround and receive a portion of the transmission shaft 84, on which the second member 80 of the first clutch 76 is mounted.

The first clutch 76 may be configured to move between an engaged position in which the first and second members 78, 80 abut and engage, and a disengaged position in which the first and second members 78, 80 are separated from one another. For example, the first member 78 and the second member 80 engage together in the engaged position for rotation as a unit such that the second CVM shaft 70 of the second CVM 44 is rotationally coupled to transmission shaft 84 via the third gear 72, the fourth gear 74, and the first clutch 76. The first member 78 and the second member 80 may disconnect for independent rotation in the disengaged position to, in effect, cut off this power flow path.

The transmission 50 may additionally include a second clutch 86 of the control set 60. The second clutch 86 may be referred to as a "reverse clutch" in some embodiments. Like the first clutch 76, the second clutch 86 may include at least one first member 88 and at least one second member 90. The first member 88 of the second clutch 86 may be fixed to the transmission shaft 84 for mutual rotation. Moreover, a fifth gear 92 may be mounted to the first member 88 of the second clutch 86 for mutual rotation as a unit with the transmission shaft 84. The second member 90 may be fixed on an end of a second hollow shaft 94 that receives and circumscribes the transmission shaft 84. A sixth gear 96 is mounted on the second hollow shaft 94 on a side opposite the second member 90 of the second clutch 86.

As above, the second clutch 86 may be configured to move between an engaged position in which the first and second members 88, 90 abut and engage, and a disengaged position in which the first and second members 88, 90 are separated from one another. As such, the second clutch 86 may engage to allow power transmission between the transmission shaft 84 and the sixth gear 96. The first and second members 88, 90 may disengage to cut off this power flow.

The sixth gear 96 may be enmeshed with an idler gear 98. The idler gear 98, in turn, may be enmeshed with a seventh gear 100, as discussed below.

The transmission 50 may include a third clutch 102 of the control set 60. The third clutch 102 may be referred to as a "forward clutch" in some embodiments. Like the above-described clutches, the third clutch 102 may include at least one first member 104 and at least one second member 106. The first member 104 of the third clutch 102 may be fixed to the seventh gear 100 for rotation about the axis of the input shaft 62. The second member 106 may be fixed to an end of a third hollow shaft 108. The first member 104 and the second member 106 of the third clutch 102 may engage to allow power transmission between the seventh gear 100 and the third hollow shaft 108. The first and second members 104, 106 of the third clutch 102 may disengage to cut off this power transmission path.

Additionally, an eighth gear 110 may be fixed on the third hollow shaft 108. The eighth gear 110 may be enmeshed with the fifth gear 92. The third hollow shaft 108 generally circumscribes the input shaft 62 and includes a first end that forms the second member 106 of the third clutch 102 and a second end that is coupled to the variator 54, as described below.

The transmission 50 may include a ninth gear 112 that may be fixed on an end of a fourth hollow shaft 114. The hollow shaft 114 may receive the input shaft 62, and both the ninth gear 112 and the hollow shaft 114 may be supported for selective rotation as a unit relative to the input shaft 62. The ninth gear 112 may be enmeshed with the third gear 72 coupled to the second CVM 44. The fourth hollow shaft 114 may also be operatively attached to the variator 54 as will be discussed.

In this example, the variator 54 may include a double planetary gearset. However, it will be appreciated that the variator 54 may vary from the illustrated embodiment without departing from the scope of the present disclosure. Furthermore, it will be appreciated that the variator 54 may include a plurality of variator members, some of which may serve as power inputs and some of which may serve as power outputs, depending on the mode in which the transmission 50 is operating.

In the illustrated embodiment, for example, the variator 54 may include a first planetary gearset 116 (a low planetary gearset) having a first sun gear 118, a first ring gear 120, and a plurality of first planet gears 122 with an associated first carrier 124. The first sun gear 118 may be fixed to the shaft 114 for rotation about the variator (and input) axis 55. The first planet gears 122 may enmeshed with and disposed between the first sun gear 118 and the first ring gear 120. The first planet gears 122 and the first carrier 124 may be configured to rotate together about the variator (and input) axis 55.

In addition, the variator 54 may include a first output member formed by a hollow first output member shaft 126 and a tenth (or first output member) gear 128 mounted on the first output member shaft 126. The first output member shaft 126 receives the hollow shaft 114 and the input shaft 62 and is further fixed to the first carrier 124 for rotation therewith about the variator (and input) axis 55.

Moreover, the variator 54 may include a second planetary gearset 130 (a high planetary gearset) having a second sun gear 132, a second ring gear 134, and a plurality of second planet gears 136 with an associated second carrier 138. The second sun gear 132 may be fixed to the shaft 114 for rotation about the variator (and input) axis 55. The second planet gears 136 may be enmeshed with and disposed between the second sun gear 132 and the second ring gear 134. The second planet gears 136 and the second carrier 138 may be configured to rotate together about the variator (and input) axis 55. The second carrier 138 may also be attached to the first ring gear 120. Likewise, the second ring gear 134 may be centered on and supported for rotation about the variator (and input) axis 55. In some embodiments, the second carrier 138 may be fixed to the third hollow shaft 108. The opposite portion of the second carrier 138 may be fixed to the first ring gear 120.

The variator 54 may also include a second output member formed by short, hollow second output member shaft 140 and an eleventh (or second output member) gear 142 mounted on the second output member shaft 140. The second output member shaft 140 is hollow and receives the input shaft 62 and hollow shaft 108. The second output member shaft 140 may be fixed to the second ring gear 134 for rotation therewith about the variator (and input) axis 55. In some embodiments, the second output member gear 142 may be disposed axially between the second planetary gearset 130 and the third clutch 102 with respect to the variator (and input) axis 55.

It is noted that the first clutch 76, the second clutch 86, and the third clutch 102 may be disposed on an input side of the variator 54. Thus, during operation of the powertrain 14, power (from the engine 38 and/or the CVP 40) may be input to the variator 54 via one or more of these clutches 76, 86, 102. The variator 54 may output power via the components that are described below.

In this example, the transmission 50 may include a twelfth gear 144. The twelfth gear 144 may be supported for rotation about the countershaft axis 59. For example, the twelfth gear 144 may be fixed on an end of a hollow shaft 146, which is centered on the countershaft axis 59.

Additionally, the transmission 50 may include a fourth clutch 148 of the control set 60. The fourth clutch 148 may be referred to as a "first range clutch" in some embodiments. Like the above-described clutches, the fourth clutch 148 may include at least one first member 150 and at least one second member 152. The first member 150 may be fixed to the hollow shaft 146 for rotation about the countershaft axis 59, and the second member 152 may be fixed to the countershaft 57. The countershaft 57 may be received within the hollow shaft 146. The first member 150 of the fourth clutch 148 may engage the second member 152 to allow power transmission from the hollow shaft 146 to the countershaft 57. The first and second members 150, 152 may alternatively disengage to cut off this power transmission path.

The transmission 50 may further include a thirteenth gear 154. The thirteenth gear 154 may be referred to as a "drive gear" in some embodiments. The thirteenth gear 154 may be fixed to the countershaft 57 for rotation therewith about the countershaft axis 59.

Additionally, the transmission 50 may include a fifth clutch 156 of the control set 60. The fifth clutch 156 may be referred to as a "second range clutch" in some embodiments. Like the above-described clutches, the fifth clutch 156 may include at least one first member 158 and at least one second member 160. The first member 158 may be fixed to the countershaft 57 for rotation about the countershaft axis 59. The second member 160 may be fixed to an end of a hollow shaft 162. The second member 160 and the hollow shaft 162 may be supported for rotation about the countershaft axis 59. The first member 158 and the second member 160 of the fifth clutch 156 may engage to allow power transmission from the hollow shaft 162 to the countershaft 57. The first and second members 158, 160 may alternatively disengage to cut off this power transmission path.

The transmission 50 may further include a fourteenth gear 164. The fourteenth gear 164 may be fixed to the hollow shaft 162 on an end that is opposite that of the fifth clutch 156. The fourteenth gear 164 may also be engaged with the second output member gear 142.

Additionally, the transmission 50 may include a fifteenth gear 166. The fifteenth gear 166 may be enmeshed with the twelfth gear 144 and may be fixed to one end of a hollow shaft 168. The hollow shaft 168 may receive the output shaft 48. The hollow shaft 168 and the fifteenth gear 166 be centered on the output axis 49 and may be supported for rotation about the output axis 49.

Additionally, the transmission 50 may include a sixth clutch 170 of the control set 60. The sixth clutch 170 may be referred to as a "third range clutch" in some embodiments. Like the above-described clutches, the sixth clutch 170 may include at least one first member 172 and at least one second member 174. The first member 172 may be fixed to the hollow shaft 168 for rotation about the output axis 49. The second member 174 may be fixed to the output shaft 48. The first member 172 of the sixth clutch 170 may engage the second member 174 to allow power transmission from the hollow shaft 168 to the output shaft 48. The first and second members 172, 174 may alternatively disengage to cut off this power transmission path.

The transmission 50 may further include a sixteenth gear 176. The sixteenth gear 176 may be enmeshed with the fourteenth gear 164. The sixteenth gear 176 may also be fixed to a hollow shaft 178, which may be centered on the output axis 49 and which may be supported for rotation about the output axis 49. The hollow shaft 178 may receive the output shaft 48.

Additionally, the transmission 50 may include a seventh clutch 180 of the control set 60. The seventh clutch 180 may be referred to as a "fourth range clutch" in some embodiments. Like the above-described clutches, the seventh clutch 180 may include at least one first member 182 and at least one second member 184. The first member 182 may be fixed to the hollow shaft 178 for rotation about the output axis 49. The second member 184 may be fixed to the output shaft 48. The first member 182 and the second member 184 of the seventh clutch 180 may engage to allow power transmission from the hollow shaft 178 to the output shaft 48. The first and second members 182, 184 may alternatively disengage to cut off this power transmission path.

The transmission 50 may further include a seventeenth gear 186, a hollow shaft 188, and a eighteenth gear 190. The seventeenth gear 186 and the eighteenth gear 190 may be fixed on opposite ends of the hollow shaft 188. The hollow shaft 188 may receive the output shaft 48. The hollow shaft 188, the seventeenth gear 186, and the eighteenth gear 190 may be supported for rotation as a unit about the output axis 49. Also, the seventeenth gear 186 may be enmeshed with the first gear 64, directly or through a nineteenth (or idler) gear 192. Although not shown, the eighteenth gear 190 may be enmeshed with a gear to drive a power sink, such as a power take-off (PTO) shaft.

Furthermore, the transmission 50 may include a twentieth gear 194. The twentieth gear 194 may be enmeshed with the thirteenth gear 154. The twentieth gear 194 may also be operatively attached to an eighth clutch 196. Like the above-described clutches, the eighth clutch 196 may include at least one first member 198 and at least one second member 200. The first member 198 may be fixed to the twentieth gear 194 (via a hollow shaft or otherwise). The first member 198 and the twentieth gear 194 may receive the output shaft 48 and may be supported for rotation about the output axis 49. The second member 200 may be fixed to the output shaft 48. The first member 198 and the second member 200 of the eighth clutch 196 may engage to allow power transmission from the twentieth gear 194 to the output shaft 48. The first and second members 198, 200 may alternatively disengage to cut off this power transmission path.

In some embodiments, the control set 60 of the transmission 50 may provide selection between at least two modes chosen from the following group: 1) an all-CVP creeper mode (including powered-zero); 2) a lower speed split-path field mode; and 3) a higher speed split-path field mode. Each of these may be forward modes for drivingly rotating the output shaft 48 in a forward direction (i.e., for moving the work vehicle 10 forward). The transmission 50 may also provide one or more reverse modes for drivingly rotating the output shaft 48 in a reverse (opposite direction) (i.e., for moving the work vehicle 10 in reverse). Several example modes will be discussed in relation to the embodiment of FIG. 2.

In one example, the transmission 50 may provide the all-CVP creeper mode (i.e., series mode) when the first, fourth, and eighth clutches 76, 148, 196 are engaged and the second, third, fifth, sixth, and seventh clutches 86, 102, 156, 170, 180 are disengaged. Accordingly, engine power from the engine 38 may be transferred from the input shaft 62 to the first gear 64, to the second gear 66, and to the first CVM 42. The first CVM 42 may convert this mechanical input to electrical output for powering the second CVM 44. Meanwhile, the second CVM 44 may drive the second CVM shaft 70 and power may be transferred from the third gear 72, to the fourth gear 74, through the first clutch 76, to the transmission shaft 84, across the first member 88 of the second clutch 86, to fifth gear 92, to eighth gear 110, to the shaft 108, through the second carrier 138, and to the first ring gear 120. In addition, CVM power at the third gear 72 may simultaneously transfer to the ninth gear 112, to the hollow shaft 114, and to the first sun gear 118. Accordingly, CVM power from the second CVM 44 may re-combine at the first planet gears 122 to drive the first output member shaft 126 and first output member gear 128. The first output member gear 128 may output this power through the twelfth gear 144, to the hollow shaft 146, through the fourth clutch 148, to the countershaft 57, to the thirteenth gear 154, to the twentieth gear 194, through the eighth clutch 196, and to the output shaft 48. Thus, this mode of the transmission 50 provides power from the CVP 40 to the output shaft 48 and also disconnects the engine 38 from the output shaft 48 (i.e., eliminates the direct mechanical connection of the engine 38 such that the engine 38 is merely powering the generator of the first CVM 42).

The transmission 50 may provide a first split-path forward mode when the third, fourth, and eighth clutches 102, 148, 196 are engaged and the first, second, fifth, sixth, and seventh clutches 76, 86, 156, 170, 180 are disengaged. In this mode, engine power from the input shaft 62 may transfer through the third clutch 102, to shaft 108, to the second carrier 138, to drivingly rotate the first ring gear 120. Engine power may also drive the input shaft 62 and power may transfer to the first gear 64, to the second gear 66, to the first CVM shaft 68 in order to drive the first CVM 42. Electrical power may be generated for powering the second CVM 44. Mechanical power from the second CVM 44, via second CVM shaft 70) may drive the third gear 72, and this power may be transferred to the ninth gear 112, and to the shaft 114 in order to drive the first sun gear 118. The variator 54 may sum or combine the engine power (at the first ring gear 120) and the CVP power (at the first sun gear 118) and output combined power via the first planet gears 122 and associated first carrier 124 to drivingly rotate the first output member shaft 126 and first output member gear 128. The first output member gear 128 may transfer this power through the twelfth gear 144 to the hollow shaft 146, through the fourth clutch 148, to the countershaft 57, to the thirteenth gear 154, to the twentieth gear 194, through the eighth clutch 196, and to the output shaft 48. In some embodiments, the speed of the engine 38 may remain constant and the output speed of the second CVM 44 may vary in this mode.

The transmission 50 may additionally provide a second split-path forward mode when the third, fifth, and eighth clutches 102, 156, 196 are engaged and the first, second, fourth, sixth, and seventh clutches 76, 86, 148, 170, 180 are disengaged. In this mode, engine power from the input shaft 62 may transfer through the third clutch 102, to the shaft 108, and to the second carrier 138 in order to drivingly rotate the second planet gears 136. Engine power from input shaft 62 may also drive the first gear 64, and power may be transferred to the second gear 66, and to the first CVM shaft 68 in order to drive the first CVM 42. Electrical power may be generated for powering the second CVM 44. Mechanical power from the second CVM 44 (i.e., from the second CVM shaft 70) may drive the third gear 72, and this power may be transferred to the ninth gear 112, through the shaft 114, to drive the second sun gear 132. The variator 54 may sum or combine the engine power (at the second planet gears 136) and the CVP power (at the second sun gear 132) and output combined power via the second ring gear 134 to drivingly rotate the second output member shaft 140. The second output member shaft 140 may transfer this power through the second output member gear 142 to the fourteenth gear 164, through the fifth clutch 156, to the countershaft 57, to the thirteenth gear 154, to the twentieth gear 194, through the eighth clutch 196, and to the output shaft 48. In some embodiments, the speed of the engine 38 may remain constant and the output speed of the second CVM 44 may vary in this mode.

Furthermore, the transmission 50 may provide a third split-path forward mode when the third and sixth clutches 102, 170 are engaged and the first, second, fourth, fifth, seventh, and eighth clutches 76, 86, 148, 156, 180, 196 are disengaged. This mode may be substantially the same as the first split-path forward mode discussed above. The power flow path into the variator 54 may be the same, but the flow path out of the variator 54 may be different. Specifically, power at the first output member shaft 126 of the variator 54 may be transferred to the twelfth gear 144, to the fifteenth gear 166, to the hollow shaft 168, through the sixth clutch 170, and to the output shaft 48.

Moreover, the transmission 50 may provide a fourth split-path forward mode when the third and seventh clutches 102, 180 are engaged and the first, second, fourth, fifth, sixth, and eighth clutches 76, 86, 148, 156, 170, 196 are disengaged. This mode may be substantially the same as the second split-path forward mode discussed above. The power flow path into the variator 54 may be the same, but the flow path out of the variator 54 may be different. Specifically, power at the second output member shaft 140 and second output member gear 142 of the variator 54 may be transferred to the fourteenth gear 164, to the sixteenth gear 176, to the hollow shaft 178, through the seventh clutch 180, and to the output shaft 48.

Additionally, the transmission 50 may provide a plurality of reverse modes. In some embodiments, there may be a corresponding number of forward and reverse split-path modes. The control set 60 may provide the reverse modes similar to the forward modes discussed above, except that the second clutch 86 is engaged instead of the third clutch 102 in each. For example, a first split-path reverse mode may be provided when the second, fourth, and eighth clutches 86, 148, 196 are engaged and the first, third, fifth, sixth, and seventh clutches 76, 102, 156, 170, 180 are disengaged. Accordingly, engine power from the input shaft 62 may transfer through the seventh gear 100, to the idler gear 98, to the sixth gear 96, to the shaft 94, through the second clutch 86, through fifth gear 92, to the shaft 108, and to the second carrier 138 in order to drivingly rotate the first ring gear 120. Engine power may also drive the input shaft 62, and power may be transferred to the first gear 64, and to the first CVM shaft 68 in order to drive the first CVM 42. Electrical power may be generated for powering the second CVM 44. Mechanical power from the second CVM 44 (i.e., from the second CVM shaft 70) may drive the third gear 72, and this power may be transferred to the ninth gear 112, through the shaft 114, to drive the first sun gear 118. As discussed above, the variator 54 may output combined power via the first planet gears 122 and associated first carrier 124 to drivingly rotate the first output member shaft 126. The first output member shaft 126 may transfer this power through the twelfth gear 144, through the fourth clutch 148, to the countershaft 57, to the thirteenth gear 154, to the twentieth gear 194, through the eighth clutch 196, and to the output shaft 48. The other reverse modes may be provided in a similar fashion.

Thus, the transmission 50 provides a plurality of modes that may be useful in different conditions. The operator may select between these different modes and/or the transmission 50 may automatically shift between these modes to maintain high operating efficiency in a number of different operating conditions.

As described above, the prognostics system 12 operates to monitor the usage within the powertrain 14 and generate prognostics values associated with one or more components of the transmission 50 and powertrain 14, including the input shaft 62, the output shaft 48, and various other components (e.g., gears, bearings, etc.) within the transmission 50. In one example, the prognostics system 12 generates the usage and prognostics information at least partially as a function of the commanded torque at the second CVM 44, as will be described in greater detail with respect to FIG. 3.

Figure 3:
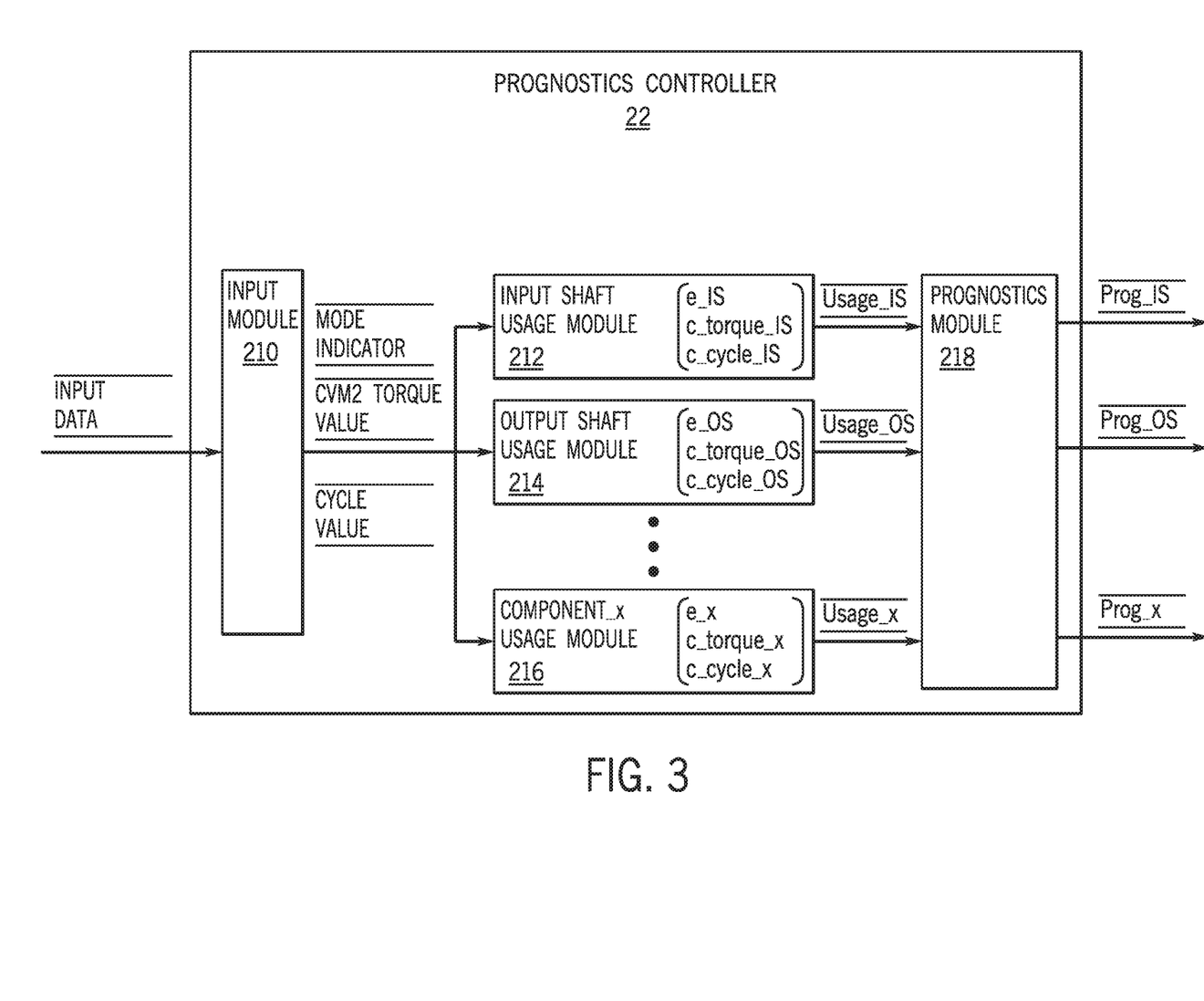
FIG. 3 is a block diagram depicting operation of the prognostics system of FIG. 1 according to an example embodiment of the present disclosure.

FIG. 3 is a simplified block diagram of the prognostics controller 22 depicting operational characteristics of the prognostics system 12. The prognostics controller 22 may be organized as one or more functional units or modules 210, 212, 214, 216, 218 (e.g., software, hardware, or combinations thereof) implemented with processing architecture such as a processor and memory (e.g., processor 20 and memory 21 of FIG. 1). The block diagram of FIG. 3 additionally depicts various types of data flow in and out of the prognostics controller 22 and between the modules 210, 212, 214, 216, 218. The data flows and organization depicted in FIG. 3 are merely examples, and other mechanisms for performing similar functions may be provided, certain functions may be omitted, and additional functions may be added. In the depicted embodiment, the prognostics controller 22 of the prognostics system 12 includes an input module 210, an input shaft usage module 212, an output shaft usage module 214, a component usage module 216, and a prognostics module 218, as will be discussed in greater detail below. Aspects of FIGS. 1 and 2 may be referenced below in the discussion of FIG. 3.

The prognostics controller 22 may receive input data from one or more data sources at the input module 210. As examples, and as discussed in greater detail below, such input data may include current transmission mode information and the commanded torque generated by the vehicle controller (e.g., vehicle controller 22). The mode information corresponds to the current mode of the transmission 50, as discussed above, and generally represents the current torque and/or speed relationships of the components within the powertrain 14. In one example, the commanded torque received by prognostics controller 22 corresponds to the commanded torque generated for the second CVM 44. As such, the commanded torque effectively corresponds to the torque generated by the second CVM 44 to drive the transmission 50, and thus, corresponds to the torque being imparted onto the various components of the transmission 50 as a function of the mode of power flow through the transmission 50.

In some examples, the input data may further include cycle (or speed) data for one or more components of the transmission 50, such as the input shaft 62 and/or the output shaft 48. Generally, the input module 210 may filter and/or condition the input data, as appropriate, to generate the mode indicator, one or more second CVM torque values, and one or more cycle values, which are provided to the input shaft usage module 212, the output shaft usage module 214, and the component usage module 216.

Generally, the prognostics controller 22 may monitor and evaluate any suitable component of the powertrain 14. In one example, the prognostics controller 22 generates usage and/or prognostics information associated with the input shaft 62 and the output shaft 48. As such, the prognostics controller 22 includes the input shaft usage module 212 to generate usage values for the input shaft 62 and the output shaft usage module 214 to generate usage values for the output shaft 48. As also depicted in FIG. 3, one or more other components (e.g., individual or sets of gears, bearings, clutches, and the like) may be monitored and evaluated, as generically represented by the component usage module 216.

As noted above, the usage modules 212, 214, 216 may receive one or more mode indicators, second CVM torque values, and/or one or more cycle values for any suitable time period. In response, the usage modules 212, 214, 216 generate usage values associated with the respective components. The usage values generated by the usage modules 212, 214, 216 correspond to quantitative representations of the nature of the usage of the respective component over the time period (e.g., a set time period or continuous operating time period).

Generally, the usage value is a function of the torque imparted on the component, as derived from the commanded torque of the second CVM 44. In one example, the usage value over a time period is represented by the following Equation (1):

$$U_{comp} = n_{comp} * (T_{CVM2} * c_{tor\_comp})^{e_{comp}} \qquad (1)$$

wherein, $U_{comp}$ is the component usage value;

$n_{comp}$ is the component cycle value;

$T_{CVM2}$ is the second CVM torque value;

$c_{tor\_comp}$ is torque gear ratio constant; and $e_{comp}$ is the usage exponent associated with the respective component.

In Equation (1), the component cycle value ($n_{comp}$) represents the number of cycles for the respective component over the time period. The component cycle value ($n_{comp}$) may be measured directly for the respective component, e.g., as part of the input data and/or cycle value; derived from measured cycle values for one or more components other than the respective component, e.g., as part of the input data and/or cycle value; and/or derived from one or more other parameters. If the component cycle value ($n_{comp}$) is derived from a measured cycle value for one or more components other than the respective component, the component cycle value ($n_{comp}$) may be calculated by multiplying the measured cycle value by a cycle gear ratio constant ($c_{cycle\_comp}$) representing the relationship between the measured position and the respective component in the particular mode of the transmission 50. In such an example, if the cycle values are measured by sensors associated with the input shaft 62 and/or output shaft 48, the cycle gear ratio constant ($c_{cycle\_comp}$) represents the relationship between the input shaft 62, the output shaft 48, and the respective component within the current mode of the transmission 50. Thus, there may be a set of cycle gear ratio constants ($c_{cycle\_comp}$), one for each mode. The cycle gear ratio constants ($c_{cycle\_comp}$) may be stored and/or otherwise accessed by the respective usage module 212, 214, 216 (e.g., within memory 21 or a database).

The second CVM torque value ($T_{CVM2}$), as noted above, is typically the commanded torque of the second CVM 44 that is provided as part of the input data received by the prognostics controller 22. In order to determine the nature of the torque imparted upon the respective component, the second CVM torque value ($T_{CVM2}$) is multiplied by a torque gear ratio constant ($c_{tor\_comp}$) selected based on the current mode of the transmission 50. In particular, the torque gear ratio constant ($c_{tor\_comp}$) represents the relationship between the second CVM 44 and the respective component, thereby reflecting the gear ratios of the power flow path for the particular mode. Thus, there may be a set of torque gear ratio constants ($c_{tor\_comp}$), one for each mode. The torque gear ratio constants ($c_{tor\_comp}$) may be stored and/or otherwise accessed by the respective usage module 212, 214, 216 (e.g., within memory 21 or a database).

As noted above, the torque gear ratio constant ($c_{tor\_comp}$) and cycle gear ratio constant ($c_{cycle\_comp}$) are functions of the gear ratios of the power flow path of the particular mode between the subject component and the transmission position in which the value is known or measured. One example is described for the output shaft 48 in the first split path mode in which torque from the second CVM 44 flows through the second CVM shaft 70, the third gear 72, the ninth gear 112, the fourth hollow shaft 114, the first sun gear 118, the first planet gears 122, the first carrier 124, the first output member shaft 126, the first output member (or tenth) gear 128, the twelfth gear 144, hollow shaft 146, the fourth clutch 148, the countershaft 57, the thirteenth gear 154, the twentieth gear 194, the eighth clutch 196, and the output shaft 48, as described above. As such, the torque gear ratio constant ($c_{tor\_OS\_SP1}$) for the output shaft may be represented by the following Equation (2):

$$c_{torque\_OS\_SP1} = \frac{G_9}{G_3} \times (LP+1) \times \frac{G_{12}}{G_{10}} \times \frac{G_{20}}{G_{13}} \times (-1) \quad (2)$$

wherein, $c_{tor\_OS\_SP1}$ is the torque gear ratio constant for the output shaft 48 in the first split path mode;
$G_3$ is the number of teeth of the third gear 72;
$G_9$ is the number of teeth of the ninth gear 112;
$G_{10}$ is the number of teeth of the tenth gear 128;
$G_{12}$ is the number of teeth of the twelfth gear 144;
$G_{13}$ is the number of teeth of the thirteenth gear 154;
$G_{20}$ is the number of teeth of the twentieth gear 194; and
LP is the effective number of teeth through the first sun gear 118, the first planet gears 122, and the first carrier 124 of the low planetary gearset 116.

As such, using an example in which $G_3$ is 20, $G_9$ is 81, $G_{10}$ is 71, $G_{12}$ is 72, $G_{13}$ is 33, $G_{20}$ is 75, and LP is 103/41, the resulting the torque gear ratio constant ($c_{tor\_OS\_M2}$) for the output shaft 48 in the second mode is −31.78. As noted above, this value may be used to determine the amount of torque imparted onto the output shaft 48 from the torque originating from the second CVM 44 during the first split path mode.

The usage exponent ($e_{comp}$) generally represents one relative indication of the impact of torque on the respective component. The usage exponent ($e_{comp}$) for each component or component type may be developed empirically based on usage and/or damage analysis or testing. The usage exponent ($e_{comp}$) may be stored and/or accessed by the respective usage module 212, 214, 216 (e.g., within memory 21 or a database). As examples, the usage exponent ($e_{comp}$) for bearings with point contact may be 3, and the usage exponent ($e_{comp}$) for bearings with line contact may be 3.3.

Accordingly, the usage modules 212, 214, 216 use these parameters to determine usage values for the respective component over the subject time period. The usage values are provided to the prognostics module 218.

The prognostics module 218 generally functions as an aggregator for the usage values to generate the overall usage values over the life of the relevant components, represented as prognostics values. In effect, the prognostic value is a lifetime usage value. As such, for each subject component, the prognostics module 218 maintains a current prognostics value that is updated (e.g., increased) as new usage values are generated during operation of the transmission 50 and associated monitoring by the prognostics system 12. In the depicted example, the prognostics value for the output shaft 48 represents the aggregated usage values associated with the output shaft 48 over the life of the output shaft 48, and the prognostics value for the input shaft 62 represents the aggregated usage values associated with the input shaft 62 over the life of the input shaft 62.

As shown in FIG. 3, the prognostics module 218 generates the prognostics value for each component. The prognostics values may be provided to the operator (e.g., via the operator interface 24), stored on the vehicle 10 (e.g., in memory 21) for later evaluation, and/or sent offboard the vehicle 10 (e.g., to monitoring center 30 via communication component 32).

In some examples, the prognostics module 218 may compare the prognostics values to predetermined limits representing milestones in the life of the respective component. For example, a prognostics value greater than a first predetermined limit indicates that the vehicle 10 should be serviced to further evaluate the subject component. As another example, a prognostics value greater than a second predetermined limit indicates that the vehicle 10 should be serviced to replace the subject component because the component is nearing the end of useful life. The predetermined limits may be determined empirically with testing and analysis of the various components.

Accordingly, the present disclosure provides a prognostics system that monitors and/or evaluates the components of the powertrain, particularly the transmission. In one example, the prognostics system generates usage and prognostics values for a component of interest based the torque applied to the respective component. The torque applied to the respective component may be derived from the commanded torque to the CVP, which is generally generated by a vehicle controller during operation of the powertrain. The prognostics value is updated as operation continues to provide a running indication of the lifetime wear of the component. As a result, the prognostics values may be used to evaluate components, including with respect to maintenance and replacement decisions, as well as more informed decisions with respect to design and business assessments.

Also, the following examples are provided, which are numbered for easier reference.

1. A work vehicle comprising: an engine; at least one continuously variable power source (CVP) configured to operate according to a commanded torque; an output shaft; a transmission positioned operatively between the output shaft and the engine and the at least one CVP such that the output shaft selectively receives power from one or both of the engine and the at least one CVP to drive the output shaft; and a prognostics system configured to monitor a respective component associated with at least one of the output shaft or the transmission, the prognostics system comprising a prognostics controller having a processor and memory architecture, configured to: receive input data, including the commanded torque for the at least one CVP; generate a usage value for the respective component for a time period as a function of the commanded torque; aggregate the usage value with previous usage values to generate a prognostics value over a life of the respective component; and store the prognostics value.

2. The work vehicle of example 1, wherein the prognostics controller is configured to generate the usage value further as a function of a number of cycles of the respective component during the time period.

3. The work vehicle of example 1, wherein the prognostics controller is configured to generate the usage value further as a function of a damage exponent associated with the respective component.

4. The work vehicle of example 1, wherein the transmission is configured to operate in a selected mode of a plurality of modes that defines a speed and power flow path through the transmission between the engine, the at least one CVP, and the output shaft; and wherein the prognostics controller is configured to generate the usage value further as a function of the selected mode.

5. The work vehicle of example 1, wherein the respective component is the output shaft.

6. The work vehicle of example 1, wherein the transmission includes an input shaft coupled to receive the power from one or both of the engine and the least one CVP; and wherein respective component is the input shaft.

7. The work vehicle of example 1, wherein the prognostics controller is configured to generate the usage value according to the following equation: $U_{comp}=n_{comp}*(T_{CVP}*c_{tor\_comp})^{e_{comp}}$ wherein, $U_{comp}$ is the usage value for the respective component; $n_{comp}$ is a component cycle value; $T_{CVP}$ is the commanded torque for the at least one CVP; $c_{tor\_comp}$ is a torque gear ratio constant for a selected mode of the transmission; and $e_{comp}$ is a usage exponent associated with the respective component.

8. The work vehicle of example 1, wherein at least one CVP comprises a first continuously variable machine (CVM) and a second CVM arranged such that the engine provides power to the first CVM to generate power that is supplied to the first CVM and the second CVM provides power to the transmission for driving the output shaft, and wherein the prognostics controller is configured such that the commanded torque used to generate the usage value is a second CVM commanded torque.

9. The work vehicle of example 1, further comprising a communication component configured to receive the prognostics value from the prognostics controller and to transmit the prognostics value to a maintenance center offboard the work vehicle.

10. The work vehicle of example 1, further comprising a display device configured to receive the prognostics value from the prognostics controller and to display the prognostics value to an operator of the work vehicle.

11. A prognostics system for work vehicle with a powertrain having a transmission with a clutch arrangement to selectively transform input torque from an engine and a continuously variable power source (CVP) into output torque to drive an output shaft, the prognostics system comprising: a prognostics controller configured to monitor a respective component associated with at least one of the output shaft or the transmission, the prognostics controller comprising: a processor; and memory storing one or more computer programs executable by the processor to: receive input data, including the commanded torque for the at least one CVP; generate a usage value for the respective component for a time period as a function of the commanded torque; aggregate the usage value with previous usage values to generate a prognostics value over a life of the respective component; and store the prognostics value.

12. The prognostics system of example 11, wherein the prognostics controller is configured to generate the usage value further as a function of a number of cycles of the respective component during the time period.

13. The prognostics system of example 11, wherein the prognostics controller is configured to generate the usage value further as a function of a damage exponent associated with the respective component.

14. The prognostics system of example 11, wherein the transmission is configured to operate in a selected mode of a plurality of modes that defines a speed and power flow path through the transmission between the engine, the at least one CVP, and the output shaft; and wherein the prognostics controller is configured to generate the usage value further as a function of the selected mode.

15. The prognostics system of example 11, wherein at least one CVP comprises a first continuously variable machine (CVM) and a second CVM arranged such that the engine provides power to the first CVM to generate power that is supplied to the first CVM and the second CVM provides power to the transmission for driving the output shaft; and wherein the prognostics controller is configured such that the commanded torque used to generate the usage value is a second CVM commanded torque.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

As will be appreciated by one skilled in the art, certain aspects of the disclosed subject matter can be embodied as a method, system (e.g., a work machine control system included in a work machine), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of work vehicles.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. A work vehicle comprising:
   an engine;
   at least one continuously variable power source (CVP) configured to operate according to a commanded torque;
   an output shaft;
   a transmission positioned operatively between the output shaft and the engine and the at least one CVP such that the output shaft selectively receives power from one or both of the engine and the at least one CVP to drive the output shaft; and
   a prognostics system configured to monitor a respective component associated with the output shaft or the transmission or both, the prognostics system comprising a prognostics controller having a processor and memory architecture configured to:
   receive input data, including the commanded torque for the at least one CVP;
   generate a usage value for the respective component for a time period as a function of the commanded torque;
   aggregate the usage value with previous usage values to generate a prognostics value over a life of the respective component;
   compare the prognostics value to a predetermined limit; and
   output the prognostics value to indicate that the work vehicle should be serviced in order to evaluate the respective component when the prognostics value is greater than the predetermined limit.

2. The work vehicle of claim 1, wherein the prognostics controller is configured to generate the usage value further as a function of a number of cycles of the respective component during the time period.

3. The work vehicle of claim 1, wherein the prognostics controller is configured to generate the usage value further as a function of a damage exponent associated with the respective component.

4. The work vehicle of claim 1, wherein the transmission is configured to operate in a selected mode of a plurality of modes that defines a speed and power flow path through the transmission between the engine, the at least one CVP, and the output shaft; and
   wherein the prognostics controller is configured to generate the usage value further as a function of the selected mode.

5. The work vehicle of claim 1, wherein the respective component is the output shaft.

6. The work vehicle of claim 1, wherein the transmission includes an input shaft coupled to receive the power from one or both of the engine and the least one CVP; and
   wherein the respective component is the input shaft.

7. The work vehicle of claim 1, wherein the prognostics controller is configured to generate the usage value according to the following equation:

$$U_{comp} = n_{comp} * (T_{CVM2} * c_{tor\_comp})^{e_{comp}}$$

wherein,
$U_{comp}$ is the usage value for the respective component;
$n_{comp}$ is a component cycle value;
$T_{CVP}$ is the commanded torque for the at least one CVP;
$c_{tor\_comp}$ is a torque gear ratio constant for a selected mode of the transmission; and
$e_{comp}$ is a usage exponent associated with the respective component.

8. The work vehicle of claim 1,
   wherein the at least one CVP comprises a first continuously variable machine (CVM) and a second CVM arranged such that the engine provides power to the first CVM to generate power that is supplied to the first CVM and the second CVM provides power to the transmission for driving the output shaft, and
   wherein the prognostics controller is configured such that the commanded torque used to generate the usage value is a second CVM commanded torque.

9. The work vehicle of claim 1, further comprising a communication component configured to receive the prognostics value from the prognostics controller and to transmit the prognostics value to a maintenance center offboard the work vehicle.

10. The work vehicle of claim 1, further comprising a display device configured to receive the prognostics value from the prognostics controller and to display the prognostics value to an operator of the work vehicle.

11. A prognostics system for a work vehicle with a powertrain having a transmission with a clutch arrangement to selectively transform input torque from an engine and a continuously variable power source (CVP) into output torque to drive an output shaft, the prognostics system comprising:
   a prognostics controller configured to monitor a respective component associated with the output shaft or the transmission or both, the prognostics controller comprising:

a processor; and memory storing one or more computer programs executable by the processor to:

receive input data, including the commanded torque for the at least one CVP;

generate a usage value for the respective component for a time period as a function of the commanded torque;

aggregate the usage value with previous usage values to generate a prognostics value over a life of the respective component;

compare the prognostics value to a predetermined limit; and output the prognostics value to indicate that the work vehicle should be serviced in order to evaluate the respective component when the prognostics value is greater than the predetermined limit.

12. The prognostics system of claim 11, wherein the prognostics controller is configured to generate the usage value further as a function of a number of cycles of the respective component during the time period.

13. The prognostics system of claim 11, wherein the prognostics controller is configured to generate the usage value further as a function of a damage exponent associated with the respective component.

14. The prognostics system of claim 11, wherein the transmission is configured to operate in a selected mode of a plurality of modes that defines a speed and power flow path through the transmission between the engine, the at least one CVP, and the output shaft; and wherein the prognostics controller is configured to generate the usage value further as a function of the selected mode.

15. The prognostics system of claim 11, wherein the respective component is the output shaft.

16. The prognostics system of claim 11, wherein the transmission includes an input shaft coupled to receive the power from one or both of the engine and the least one CVP, and wherein the respective component is the input shaft.

17. The prognostics system of claim 11, wherein the prognostics controller is configured to generate the usage value according to the following equation:

$$U_{comp} = n_{comp} * (T_{CVM2} * c_{tor\_comp})^{e_{comp}}$$

wherein, $U_{comp}$ is the usage value for the respective component;

$n_{comp}$ is a component cycle value;

$T_{CVP}$ is the commanded torque for the at least one CVP;

$c_{tor-comp}$ is a torque gear ratio constant for a selective mode of the transmission; and $e_{comp}$ is a usage exponent associated with the respective component.

18. The prognostics system of claim 11, wherein the at least one CVP comprises a first continuously variable machine (CVM) and a second CVM arranged such that the engine provides power to the first CVM to generate power that is supplied to the first CVM and the second CVM provides power to the transmission for driving the output shaft; and wherein the prognostics controller is configured such that the commanded torque used to generate the usage value is a second CVM commanded torque.

19. The prognostics system of claim 11, further comprising a communication component configured to receive the prognostics value from the prognostics controller and to transmit the prognostics value to a maintenance center offboard the work vehicle.

20. The prognostics system of claim 11, further comprising a display device configured to receive the prognostics value from the prognostics controller and to display the prognostics value to an operator of the work vehicle.

* * * * *

UNITED STATES PATENT AND TRADEMARK OFFICE
CERTIFICATE OF CORRECTION

PATENT NO. : 11,358,657 B2
APPLICATION NO. : 16/669112
DATED : June 14, 2022
INVENTOR(S) : Ryken et al.

It is certified that error appears in the above-identified patent and that said Letters Patent is hereby corrected as shown below:

In the Claims

In Column 22, Claim 7, Line 30, delete "*Ucomp = ncomp * (TCVM2 * Ctor_comp)ecomp*" and insert -- $U_{comp} = n_{comp} * (T_{CVP} * C_{tor\_comp})^{e_{comp}}$ --, therefor.

In Column 23, Claim 11, Line 6, delete "the" and insert -- a --, therefor.

In Column 24, Claim 17, Line 8, delete "*Ucomp = ncomp * (TCVM2 * Ctor_comp)ecomp*" and insert -- $U_{comp} = n_{comp} * (T_{CVP} * C_{tor\_comp})^{e_{comp}}$ --, therefor.

In Column 24, Claim 17, Line 13, delete "ctor-comp" and insert -- ctor_comp --, therefor.

Signed and Sealed this
Twenty-seventh Day of June, 2023

Katherine Kelly Vidal
*Director of the United States Patent and Trademark Office*